United States Patent [19]

Ostrander et al.

[11] Patent Number: 5,087,122
[45] Date of Patent: Feb. 11, 1992

[54] ADJUSTABLE ATTENUATOR FOR OPTICAL TRANSMISSION SYSTEM

[75] Inventors: Frederick M. Ostrander, Oriskany; Hosain Hakimi, Utica, both of N.Y.

[73] Assignee: Laser Precision Corporation, Utica, N.Y.

[21] Appl. No.: 565,804

[22] Filed: Aug. 13, 1990

[51] Int. Cl.$^5$ .................. G01N 21/84; G05D 25/00
[52] U.S. Cl. ......................... 356/73.1; 359/234; 359/236
[58] Field of Search ............ 350/266, 273, 275; 356/73.1

[56] References Cited

U.S. PATENT DOCUMENTS

| | | | |
|---|---|---|---|
| 3,529,897 | 9/1970 | Pfaffenberger | 350/266 X |
| 3,901,596 | 8/1975 | Vincent et al. | 356/4 |
| 3,963,326 | 6/1976 | Buchert | 350/266 |
| 4,516,827 | 5/1985 | Lance et al. | 350/96.15 |
| 4,560,252 | 12/1985 | Mori | 350/315 |
| 4,591,231 | 5/1986 | Kaiser et al. | 350/96.18 |
| 4,904,044 | 2/1990 | Tamulevich | 350/96.18 |
| 4,925,273 | 5/1990 | Maisenbacher et al. | 350/315 |

FOREIGN PATENT DOCUMENTS

| | | | |
|---|---|---|---|
| 60-166905 | 8/1985 | Japan | 350/273 |
| 543802 | 3/1942 | United Kingdom | 350/273 |

Primary Examiner—Vincent P. McGraw
Attorney, Agent, or Firm—Thomas J. Plante

[57] ABSTRACT

An improved variable rate attenuator (VOA) is disclosed, which is used in an optical signal transmission system for testing (and other) purposes. In an optical fiber data transmission system, the VOA can be used to determine how much attenuation of the light beam can be tolerated without causing excessive bit error rate (BER) in data transmission. The improved VOA is a blocker having a vane-like structure which is gradually rotated into a collimated beam to cause attenuation. Because the movement vector of the edge of the blocker perpendicular to the collimated beam gradually becomes less for a given increment of blocker rotation, resolution of the attenuation is improved.

16 Claims, 11 Drawing Sheets

ADJUSTABLE ATTENUATOR FOR OPTICAL TRANSMISSION SYSTEM

BACKGROUND OF THE INVENTION

This invention relates to the field of optical data transmission systems, e.g., fiber optic communications, and specifically to variable optical attenuators for use in such systems.

The instrumentation disclosed in this application was developed to function as a testing device, i.e., as a diagnostic tool, but it may also be used as a permanent portion of a fiber optic system.

Between the transmitter and receiver of a fiber optic system, attenuation of the signal strength occurs. The system is designed for a normal amount of signal loss between transmitter and receiver. At the receiver, the signal strength must be maintained within an appropriate range between overly strong and unduly weak. The minimum strength is determined by the need for an adequate signal-to-noise ratio. The maximum strength is determined by the need to avoid flooding the receiver with excessive radiation. In other words, problems are created by either under-driving or over-driving the receiver.

The ideal fiber optic transmission system has two primary capabilities. It can handle very high frequencies of multiplexed signals. A current goal is to have a bit rate of over 1 gigabit per second. The other necessary capability is a low bit error rate.

In a given system, the desired high bit frequency rate and low bit error rate will be obtained in a certain range of attenuation, measured in decibels at the receiver. In other words, as stated above, problems are encountered if the attenuation dB goes above a certain value or below a certain value. The points at which an excessive bit error rate occurs are measured both to determine the desirable dB range when the optical transmission system is installed, and to diagnose problems which occur during subsequent operation of the system. Bit error rate (BER) testing provides (a) a measure of system performance in terms of the number of errored bits per transmitted bits, and (b) a measure of sensitivity in terms of minimum received optical power required to achieve a given (low) BER. An error detector in the system is required to detect a BER which is too high for satisfactory operation.

A variable optical attenuator (VOA) is primarily a testing tool for diagnosing BER problems. A VOA is an opto-mechanical device capable of producing a desired reduction (i.e., attenuation) in the strength of a signal transmitted via fiber optic cable. The VOA should produce a continuously variable signal attenuation from 0 dB to 70 dB, while introducing a normal insertion loss of only 1.5 to 3 dB, and exhibiting an optical return loss greater than 20 dB. If the attenuator causes excessive reflectance back toward the transmitter, its purpose will be defeated.

The traditional mechanism used as a VOA is a continuously variable neutral density filter. This is essentially an optical glass substrate with a metallic coating. The density of this coating increases as it rogresses across the surface of the filter. Attenuation is created by absorption and Fresnel reflection as the filter is moved relative to the optical beam. Generally, the movement of such a filter is rotation around the axis of the attenuated beam. VOAs of the variable density filter type are expensive devices which also exhibit some weakness in spectral absorption, reflection, and refraction characteristics. A less expensive device which eliminates certain flaws of such filters is highly desirable.

A much less expensive, but crude, VOA is a full light blocking member which is moved gradually across the optical beam in a direction perpendicular to the beam. Such a blocker may be provided by a threaded element whose upper edge acts as a knife edge in cutting across the optical beam. Although these devices are inexpensive, they have very poor sensitivity. In other words, they are not capable of the fine resolution in dB measurement which is required in the critical portion of the attenuation curve.

SUMMARY OF THE INVENTION

The present invention provides a VOA which is substantially less expensive than a coated filter VOA, but which is competitive in performance. On the other hand, the VOA of the present invention is somewhat more expensive than the knife-edge screw type VOA, but has superior performance, in terms of both resolution and linearity.

The VOA of the present invention comprises a rotatable light blocking member, e.g., a vane, which is pivoted at one side of the optical beam, and gradually moves its outer edge into the optical beam as it is moved in a rotary direction from a position generally parallel to the beam toward a position generally perpendicular to the beam.

For a given amount of angular motion of the vane, the corresponding beam-cutting motion gradually reduces between the parallel and perpendicular positions of the vane. As the vane approaches the full blocking position its incremental beam-blocking motion is small enough to provide very fine dB measurement resolution.

If the VOA, in performing its function, indicates that problems exist, suitable diagnostic efforts will be made in order to determine what changes or corrections are required in the permanent optical system.

An advantage of the present invention over neutral density filters whose motion is rotary around the axis of the light beam is an increased blocking of back reflectance toward the transmitter. This increased blocking results from the refractive effect of the "knife edge" of the VOA.

DETAILED DESCRIPTION OF SPECIFIC EMBODIMENT

Figure 1:
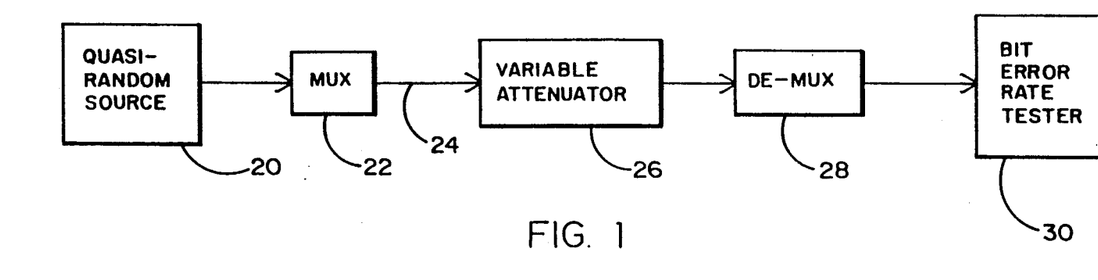
FIG. 1 is a block diagram showing an example of a system in which a variable attenuator may be used.

Variable attenuators for optical systems have many potential uses. The problems which led to development of the present invention were discussed above. In FIG. 1, a simple layout shows how a variable attenuator might be used in a fiber optic information transmission system, e.g., a telephone system. When such a system is designed, the transmitter usually generates more power than the receiver can handle. In-line attenuators are placed in front of the receiver to prevent damage. Variable attenuators are used to aid in determining system response to certain attenuation levels. Once the attenuation level has been determined, an in-line attenuator is used in its place.

One of the major applications for variable attenuators is in margin testing and validation for fiber optic transmission systems.

Once such a system has been installed, a test setup (see FIG. 1) may be used to determine how much additional loss ("margin") can be inserted into the fiber before the bit error rate (BER) exceeds a given threshold. The attenuation is increased gradually until the BER reaches the specified error rate.

As seen in FIG. 1, a quasi-random source 20 generates signals for transmission. These signals are multiplexed at 22, and sent out on a fiber optic cable 24. A variable attenuator 26 receives the signals, which, after attenuation, are de-multiplexed at 28. That output is sent to a bit error rate tester 30. In testing, the variable attenuator 26 is operated to gradually increase the attenuation (blocking) of the optical beam.

Figure 2:
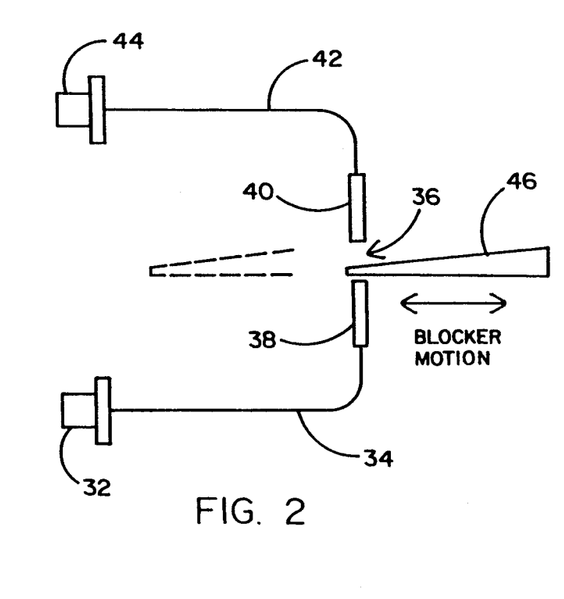
FIG. 2 is a schematic illustrating the operation of a variable attenuator.

FIG. 2 shows diagrammatically one way in which attenuation may be accomplished. The optical beam enters the attenuator at an input 32, and is delivered by a fiber optic cable 34 to a collimator section, which is indicated generally at 36. A graded index (GRIN) lens 38 expands and collimates the optical beam. After attenuation, another GRIN lens 40 collects and refocuses the remaining optical energy, and directs it via a fiber optic cable 42 to an output 44.

An attenuator/blocker 46 may be gradually moved across the collimated beam to reduce optical energy transmitted between lens 38 and lens 40.

Figure 3:
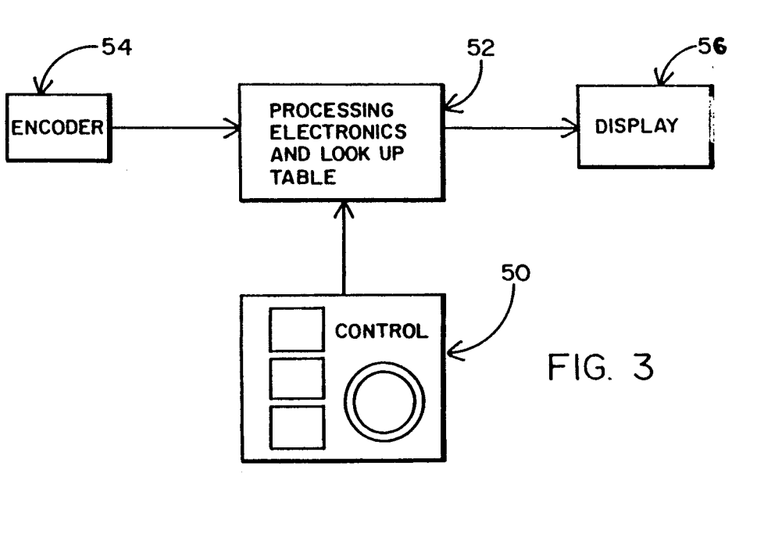
FIG. 3 is a diagram showing an example of a testing unit incorporating a variable attenuator.

FIG. 3 illustrates elements which may be included in a testing unit. A control unit 50 contains the variable attenuator and the mechanism for controlling its gradual beam-blocking motion. An electronic processing unit 52 provides a convenient means of relating the attenuator motion to the attenuation measured in dB. An encoder 54 is a device which provides information concerning the current position of the attenuator. The information from processing unit 52 may be displayed at 56.

Figure 4:
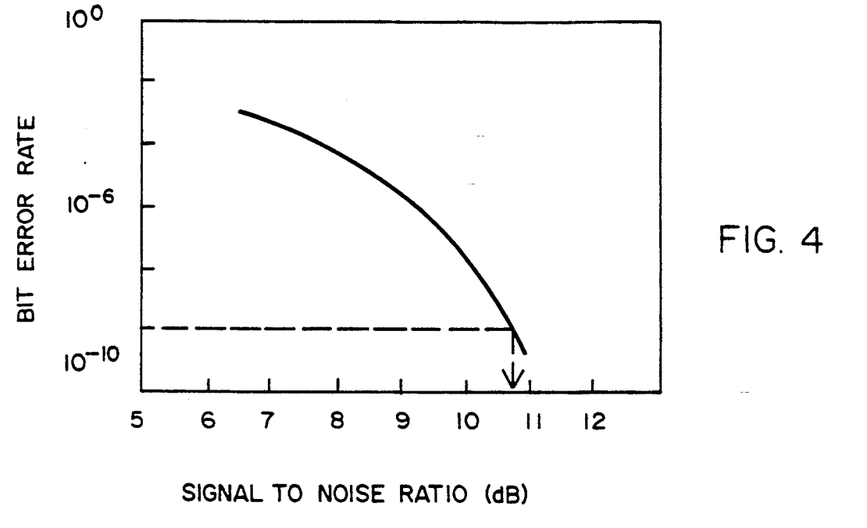
FIG. 4 is a graph which relates BER to signal-to-noise ratio.

FIG. 4 is a graph showing the relationship between the BER on the Y-axis, and signal-to-noise ratio in dB on the X-axis. As the signal-to-noise ratio increases, the bit error rate decreases. With the help of a VOA and an error counter, a diagram of the BER as a function of the received power can be drawn. Thus, a desired BER can be translated into required optical power or to a required signal-to-noise ratio.

Figure 5:
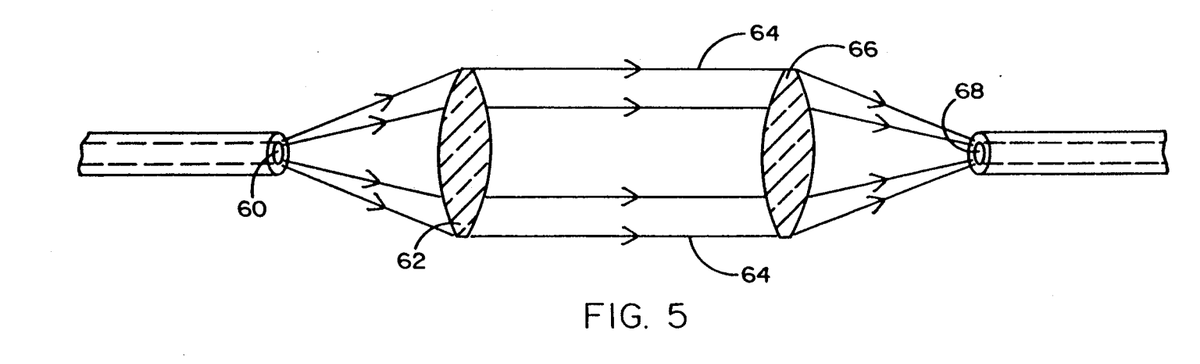
FIG. 5 is a schematic showing the basic components of a fiber optic collimator.

FIG. 5 is a more detailed representation of a fiber optic collimator used to provide the beam which is interrupted by the movable blocking element of a variable attenuator. Such a collimator is inserted in the system during attenuation testing. It must have as slight an effect as possible on the normal operation of the fiber optic system, except for the variable attenuation procedure. Light emitted from a fiber 60 is collected by a GRIN lens 62. After refraction by lens 62, an enlarged collimated beam 64 is emitted. This collimated beam is subsequently focused by a GRIN lens 66 into a fiber 68.

The collimated beam 64 is physically blocked in order to provide measured attenuation. As stated above, the most common, and expensive, blockers (attenuators) are transparent plates having deposited thereon opaque material which gradually increases in density around the plate. As the plate is rotated in the collimated beam, the light is gradually attenuated; and the attenuation is measured in decibels. Manufacture of such variable density plates is a very complex and sensitive procedure.

Figure 6:
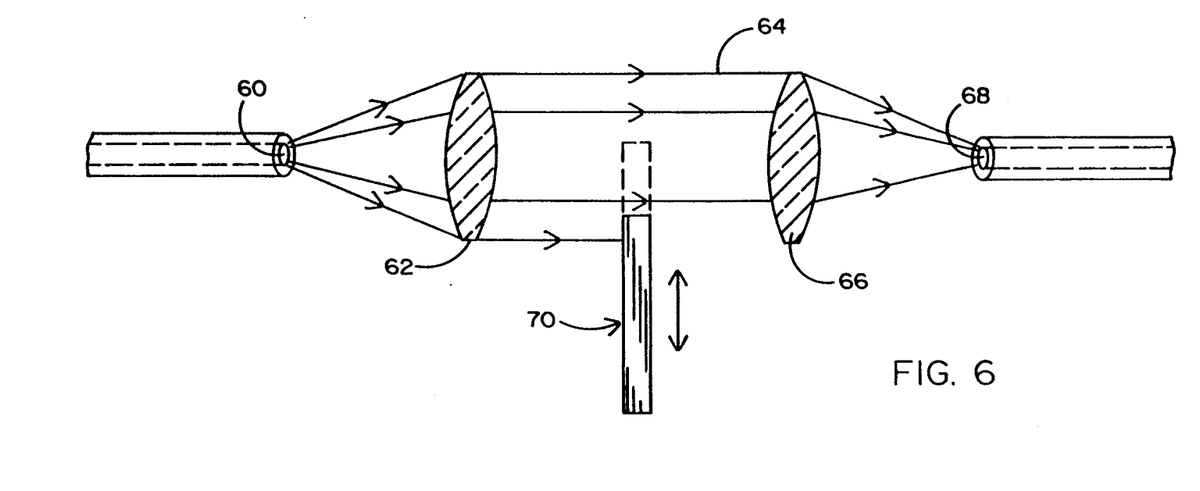
FIG. 6 shows the fiber optic collimator of FIG. 5 into which a knife edge blocker has been inserted.

At the other extreme, from the standpoint of simplicity, is the blocker shown in FIG. 6. A blocking element 70 is moved transversely and linearly across the collimated beam 64. The blocker 70 may be formed from any absorbing or reflecting material. It can be gradually moved across the collimated beam. In practice, a crude blocker of the type shown in FIG. 6, is usually a threaded element whose motion is controlled by a micrometer. Due to the non-linear attenuation characteristics of such a device, an optical attenuator having a 0 to 70 dB attenuation range, with a resolution of 0.1 dB, would require a micrometer capable of resolving movement in increments of 0.1 micron. Such precision is quite expensive.

Figure 7:
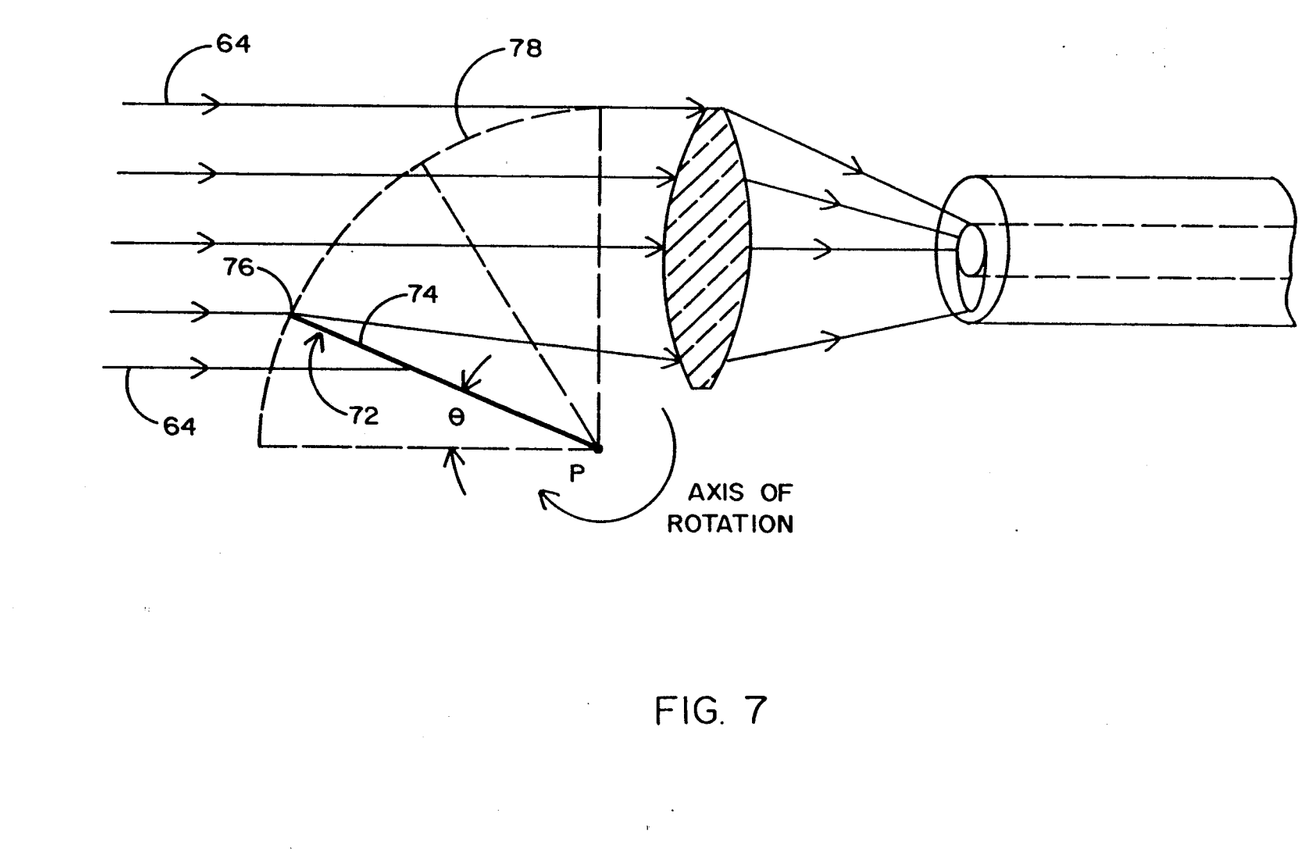
FIG. 7 shows schematically the blocker/attenuator of the present invention.

The principle of the present invention is illustrated in FIG. 7. A blocking element 72, having a vane-like upper surface 74, is pivoted at P, and has an axis of rotation around center P, as indicated by the arrow. Pivotal axis P is positioned below the collimated beam 64. The outer edge 76 of blocker 72 is movable in a clockwise direction along an arc 78 to gradually cause attenuation of the beam. Blocker 72 is located in the collimated beam, between GRIN lens 62 (not shown) and GRIN lens 66.

As the blocker is rotated into the beam, a given increment of angular motion causes a gradually decreasing increment of blocking motion of edge 76, (i.e., vertical motion in FIG. 7). In other words, the vector representing incremental motion perpendicular to the beam is reduced as the blocker moves a given increment. This provides a much-improved resolution in the critical portion of the attenuation measurement, which occurs during the latter portion of the movement toward the fully attenuated (vertical) position of the vane.

One consideration which relates to all attenuators is the round cross-section of the collimated beam. The beam width crossed by the blocker increases gradually (but non-linearly) until the center of the beam is reached. Then the beam width crossed by the blocker decreases gradually (but non-linearly) until the beam is fully blocked.

Because attenuation is measured as a ratio of blocked to unblocked light in a given increment of blocker motion, resolution in dB tends to reduce significantly as the blocker advances. For example, cutting the beam in half may produce attenuation of 3 dB. Cutting the beam from half to one-fourth may produce attenuation of 3 dB, and so on. As the blocker nears full attenuation, a very slight increment of blocking motion creates a relatively large increment of attenuation.

A first goal is to provide fine measurement resolution. A second goal is to approach linearity in the relation between the operator controlled movement of the blocker and the attenuation measured in decibels.

Blocker resolution in the attenuator of FIG. 7 can be stated as $\Delta S = R \cdot \Delta\theta$; where $\Delta S$ = blocker's incremental motion (resolution) with respect to the angular increment, R = length of blocker arm, and $\Delta\theta$ = rotational increment of angle. The lowest attainable incremental unit of angular movement of the blocker is its rotational resolution. Because of the effect of increasing angle $\theta$, the resolution of the motion of blocker edge 76 is much finer than that attainable with linear motion of the blocker edge perpendicular to the collimated beam.

As the blocker moves further into the beam, the beam cutting resolution of the device improves; and the attenuation characteristic of the device becomes more linear. As explained, the rotation angle $\theta$ of the blocker can be allowed to arc from any starting angle to a maximum of 90 degrees, at which point the collimated beam would be fully blocked (i.e., attenuated). As an example, if R and $\Delta\theta$ are chosen to yield a step resolution of 1 micron, from the relation $\Delta S' = \Delta S \cdot \cos\theta$, the resolution when $\theta = 85°$ is $\Delta S' = 0.08$ micron. This improvement in blocking resolution is implemented in the VOA device shown in FIG. 7.

Figure 8:
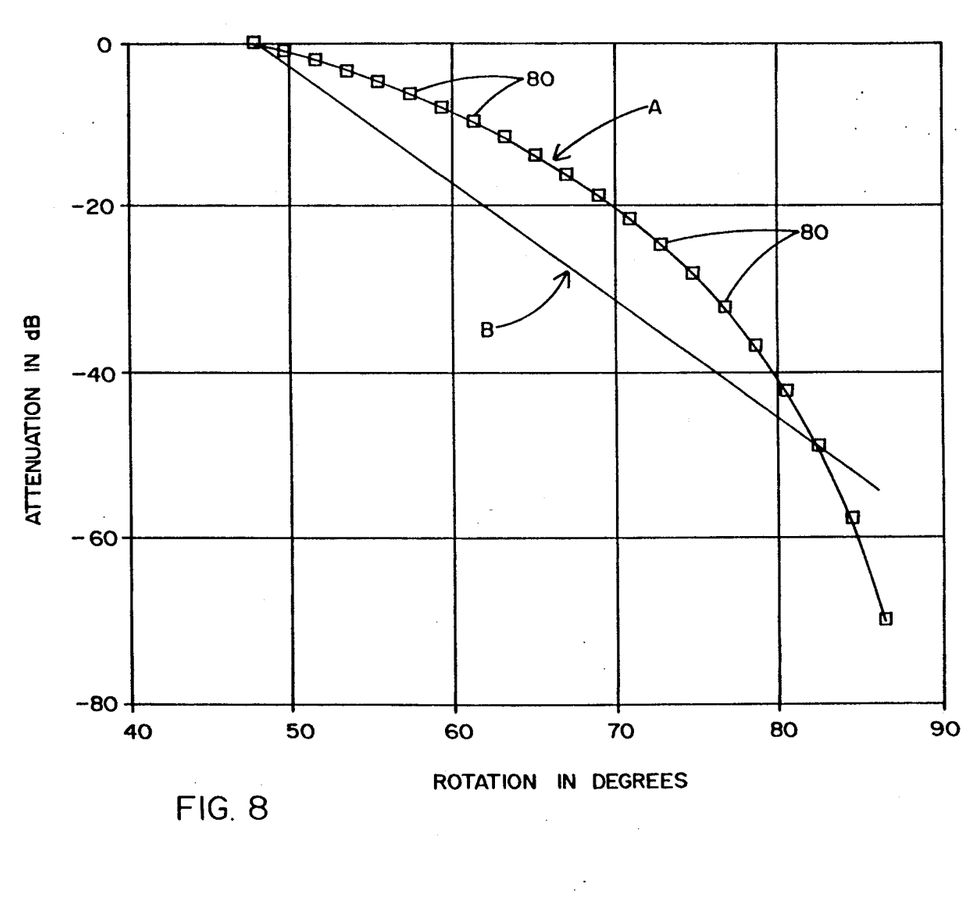
FIG. 8 is a graph relating blocker rotation in degrees (in the FIG. 7 device) to light attenuation in dB.
Figure 9:
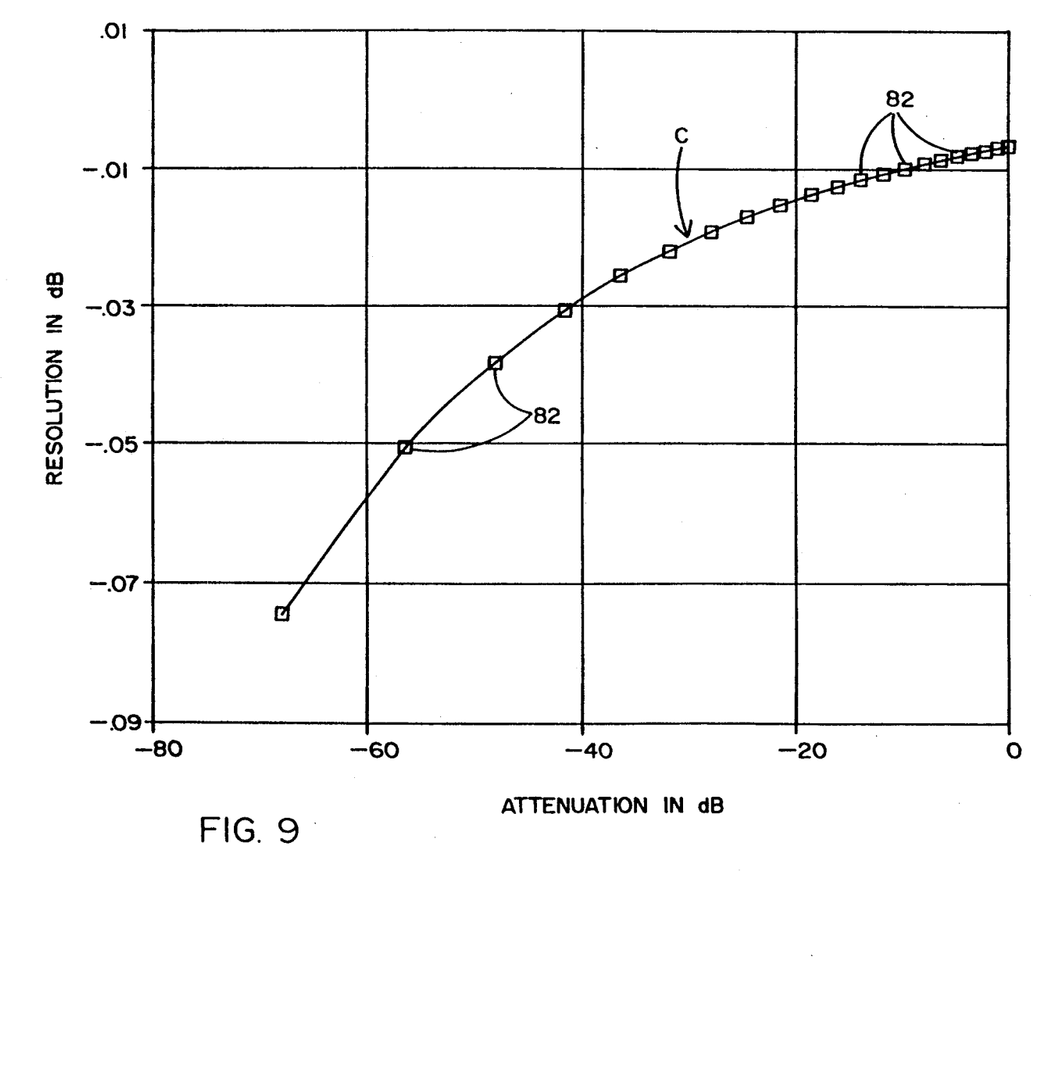
FIG. 9 is a graph relating the light attenuation in dB to the resolution in dB (in the FIG. 7 device)

FIGS. 8 and 9 are graphs which illustrate the benefits of the present invention. In FIG. 8, the X-axis shows rotation of the vane in degrees; and the Y-axis shows the attenuation in decibels. The theoretical curve A is produced by the attenuator shown in FIG. 7. In the example chosen, the knife edge of the vane begins attenuation of the light beam at about 47° from the horizontal. It reaches attenuation of 70 dB at about 87° from the horizontal. Numerous (21) points 80 are plotted along curve A, representing successive positions of a control knob which causes rotation of the vane.

A second linear curve B is shown on the graph of FIG. 8 to represent a response which would have perfect linearity between 0 dB attenuation and about 55 dB attenuation. Neutral density filters strive for maximum linearity; but their deposition processes are unlikely to attain perfect linearity.

FIG. 9 illustrates the improved resolution made possible by the present invention. The X-axis shows the attenuation in dB; and the Y-axis shows the resolution in dB. The resolution is the dB between the adjacent positions of the control knob. Curve C (like curve A) has 21 successive points 82 representing the control knob positions. In the attenuation between 0 and 20 dB, the resolution is extremely fine, i.e., in the neighborhood of 0.01 dB. As the attenuation in dB increases, the resolution necessarily becomes less fine. However, at full attenuation of approximately 70 dB, the resolution of slightly over 0.07 dB is excellent. It compares favorably to the best attainable resolution of neutral density filters, which is approximately 0.1 dB.

Figure 10:
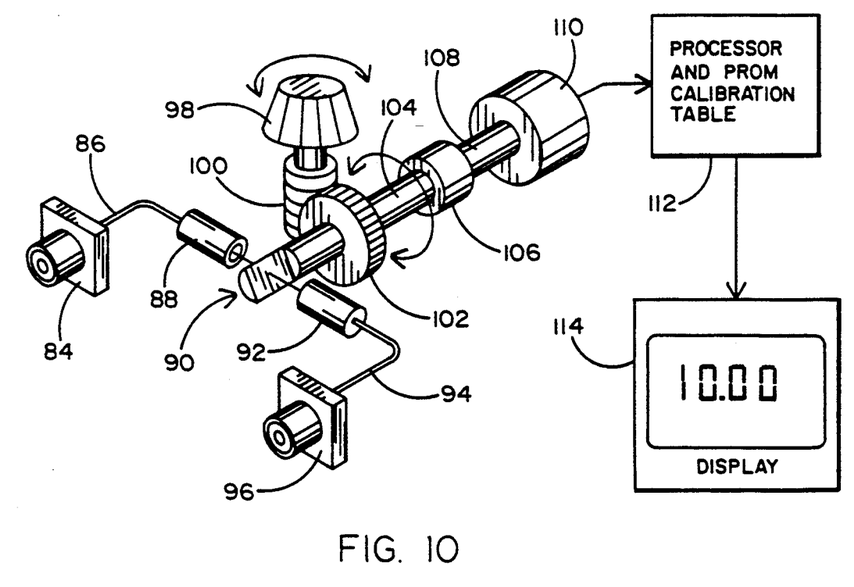
FIG. 10 is an isometric diagrammatic showing of the VOA unit of the present invention.

FIGS. 10-15 show in greater detail the structure of the VOA provided by the present invention. FIG. 10 combines an isometric showing of mechanical parts with blocks representing electronic processing and display functions.

A first fiber optic connector 84 transfers light via an optical fiber 86 to a first GRIN lens 88. An attenuator/blocker 90 controls the amount of light which reaches a second GRIN lens 92. The light received and focused by lens 92 is carried by an optical fiber 94 to a second fiber optic connector 96. The input connector 84 and output connector 96 permit insertion of the VOA unit into an existing fiber optic line at the receiver. The mechanical portions of the VOA unit comprise a manually operable knob 98, which rotates reduction gearing, e.g., a worm 100 and its engaging gear 102. Rotation of gear 102 rotates a shaft 104, coupled at 106 to a shaft 108 which operates a potentiometer 110. The potentiometer serves as the encoder indicated at 54 in FIG. 3.

As the operator turns knob 98, shaft 104 rotates the blocker 90, which is formed as a cutout portion of the shaft. Rotation of blocker 90 into the collimated beam between lens 88 and lens 92 causes gradual attenuation of the beam. The extent of attenuation is not directly measured during use of the VOA unit. The unit has been previously calibrated; and a calibration table is stored in an electronic processing unit 112. Unit 112 receives electrical signals from the potentiometer/encoder 110, and transforms those position-representing signals into an attenuation value. That value is shown on a display panel 114.

Figure 11:
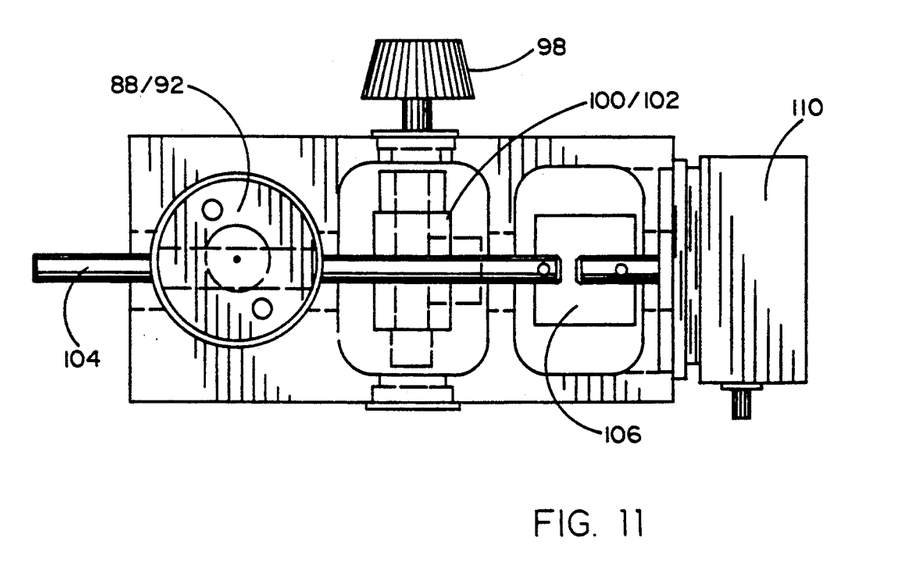
FIG. 11 is a side view of the assembled VOA unit of FIG. 10.
Figure 12:
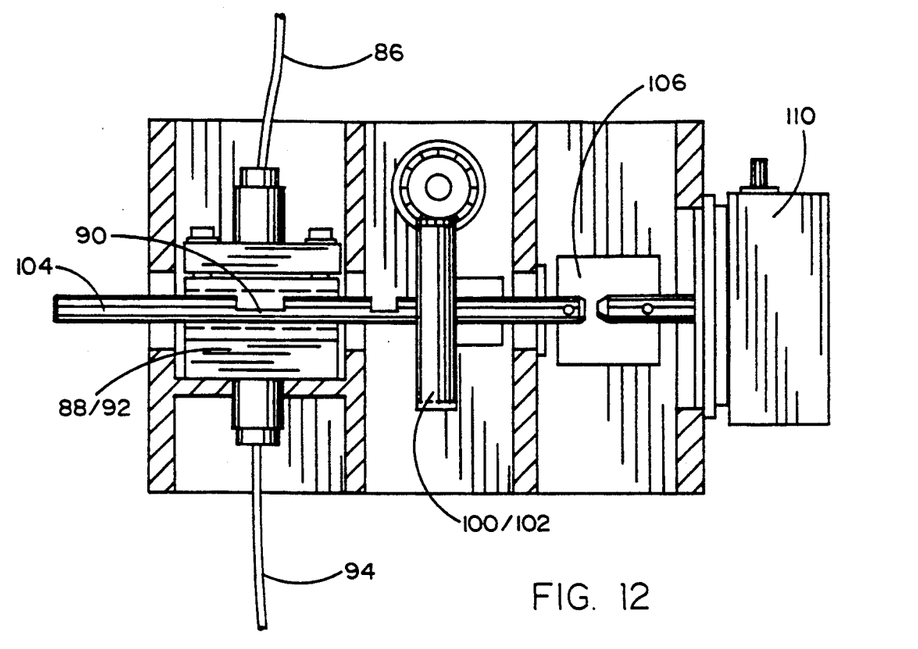
FIG. 12 is a horizontal section through the center of FIG. 11.

FIG. 11 shows a plan view of a compact VOA unit having the mechanical components of FIG. 10. FIG. 12 is a vertical section taken through the center of FIG. 11. The same identifying numerals are used in FIGS. 10, 11 and 12.

Figure 13:
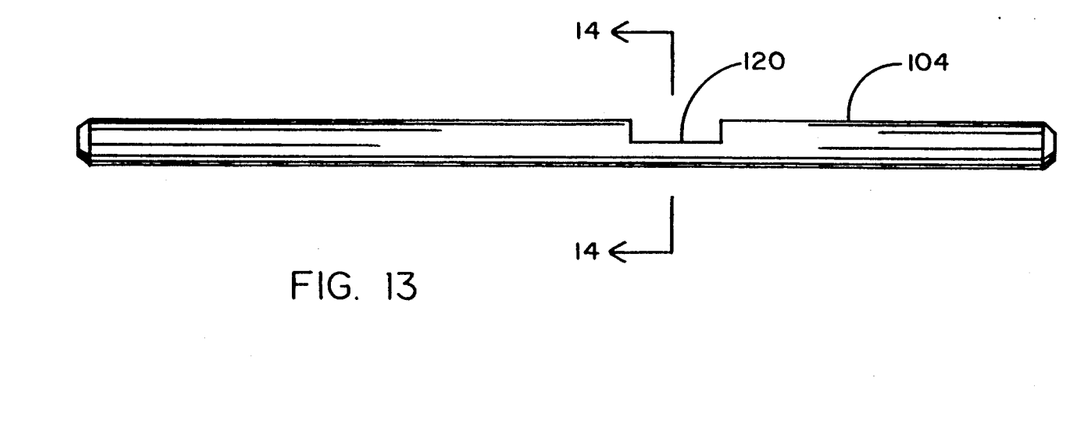
FIG. 13 is a side view of the shaft in which the blocker edge is formed by machining a slot.
Figure 14:
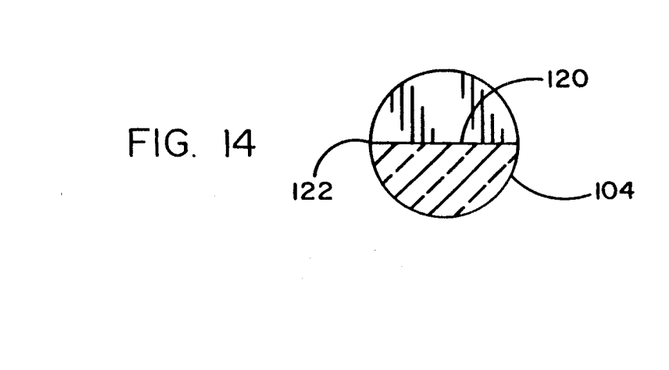
FIG. 14 is a section on the line 14—14 of FIG. 13.

FIGS. 13 and 14 show the blocker structure. The blocker is a flat surface 120 of a slot machined into shaft 104. Assuming attenuation motion (FIG. 14) in a clockwise direction, edge 122 of the blocker will cut into the collimated beam to reduce the radiation at the output lens and fiber. It is preferable not to debur edge 122, leaving a knife edge which will maximize diffraction of the radiation beam, for reasons discussed below.

The blocker surface 120 rotates into the optical path of the collimated beam, in increments determined by the knob and reduction gearing. As stated above, the blocker (shaft) is directly coupled to a motion encoding mechanism. In the embodiment shown, the encoding mechanism is a precision potentiometer. The resistance of the potentiometer is measured by a microprocessor based system, which consults a ROM based calibration table. The measured resistance value represents the rotational angle. The table relates the rotational angle to a stored value of the degree of attenuation achieved (determined by prior calibration). The result is displayed digitally in dB.

The embodiment disclosed is only exemplary. Numerous structural and functional changes can be made while retaining the usefulness of the VOA blocker motion in improving resolution and linearity, and reducing cost.

Figure 15:
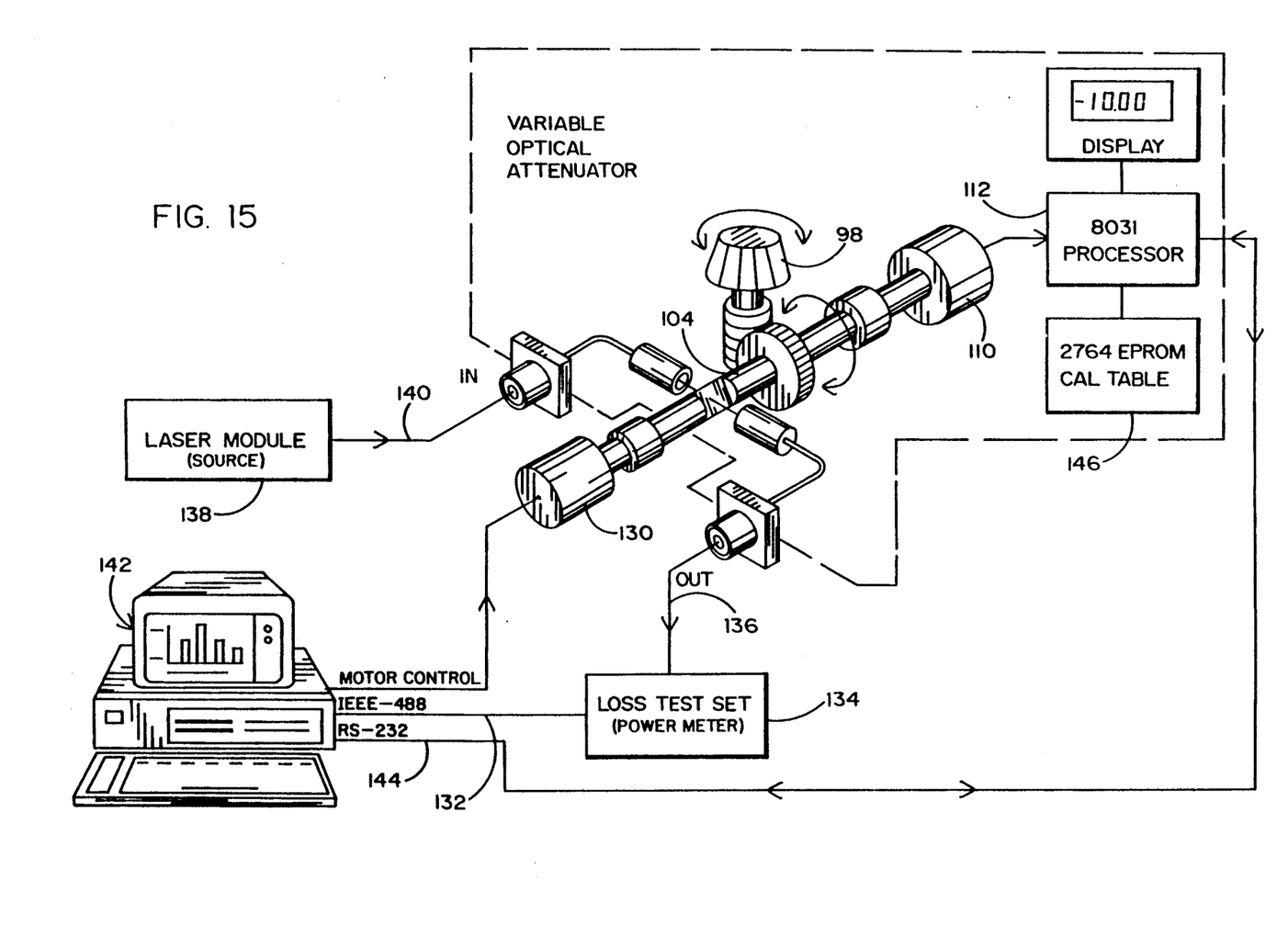
FIG. 15 is an isometric/block diagram combination showing apparatus used to calibrate the VOA unit.

FIG. 15 is a block diagram including isometric material. It illustrates an apparatus which may be used in calibrating the VOA unit previously described, which unit is enclosed by the dashed lines. The calibration procedure is performed only once, prior to shipment of the VOA unit.

The calibration setup uses a computer controlled stepping motor 130 to turn the blocking shaft 104 of the VOA (instead of the geared knob 98 used by the instrument's operator). A computer program commands the motor 130 to step forward, while monitoring the 488 signal (line 132) from a loss test set 134 (power meter). The loss test set is monitoring the optical output (fiber connector) of the VOA (line 136). Optical input is provided by a laser source 138 attached (line 140) to the input connector of the VOA. As the motor 130 turns the shaft, attenuation of the optical signal increases. The potentiometer (encoder) 110 attached to the shaft is monitored by the VOA's processor 112. The resistance of the potentiometer is reported to a computer 142 via an RS-232 line 144. At the same time, the loss measurement recorded by the power meter 134 is transmitted to computer 142 via line 132. These values are tabulated and then transmitted via RS-232 line 144 to the VOA, where they are stored in EPROM 146 as a permanent look up table. When the end user in the field turns the manual knob 98 on the VOA, the processor 112 reads the output from the potentiometer and then consults the Eprom lookup table 146 to obtain the stored attenuation value.

Figure 16:
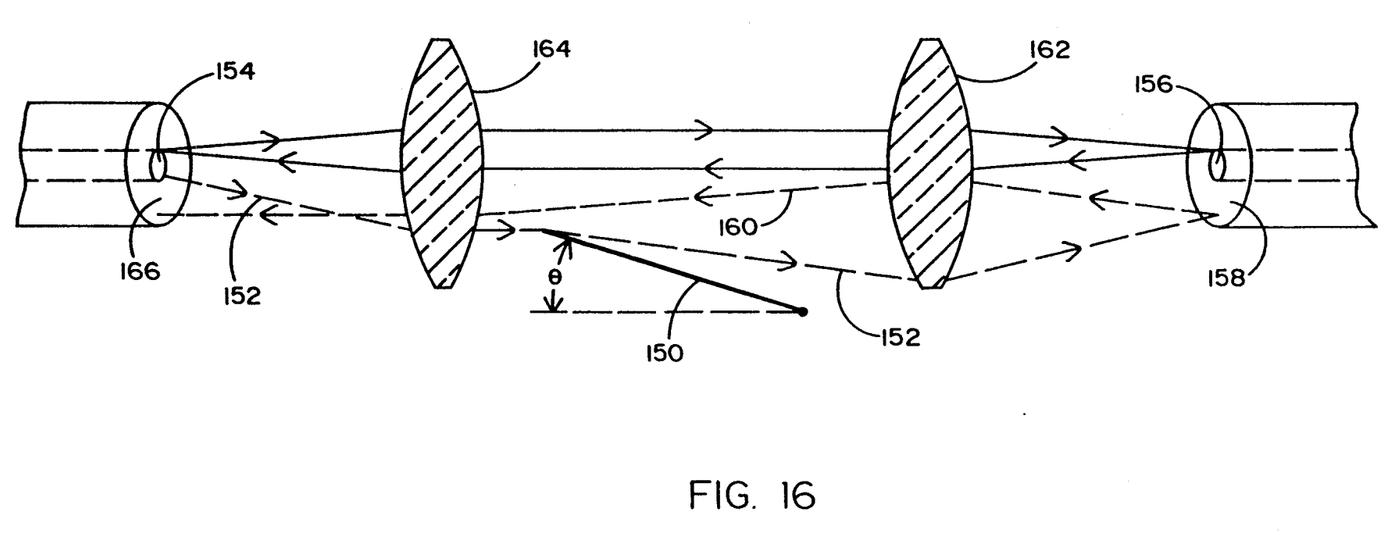
FIG. 16 shows schematically the refraction effect of a blocker having a knife edge entering the optical beam.

FIG. 16 illustrates schematically an advantage of VOAs having "knife edge" attenuation over other types of VOAs. This pertains to reduction of reflectance back toward the transmitter. In the background discussion, it was stated that the optical return loss of a VOA should be greater than 20 dB. That optical return loss can be significantly increased. Part of the increase can be accomplished in the collimator. For example, a collimator supplied by OZ Optics Ltd. reduces backscattered light by tilting one GRIN lens relative to the other.

The diffraction effect of the knife edge blocker further reduces backscattered light. As seen in FIG. 16, with blocker vane 150 at a given angle from the horizontal, a ray 152 (dashed line) emitted by input fiber 154 will be diffracted by the edge of the blocker. It will deviate from the path it would otherwise follow, and will therefore not reach output fiber 156. Although it is reflected by cover 158 surrounding fiber 156, it will follow path 160 back through the two lens 162 and 164, striking cover 166 of the input fiber. The edge refraction, in effect, causes a blurring, which reduces back scattered light.

Figure 17:
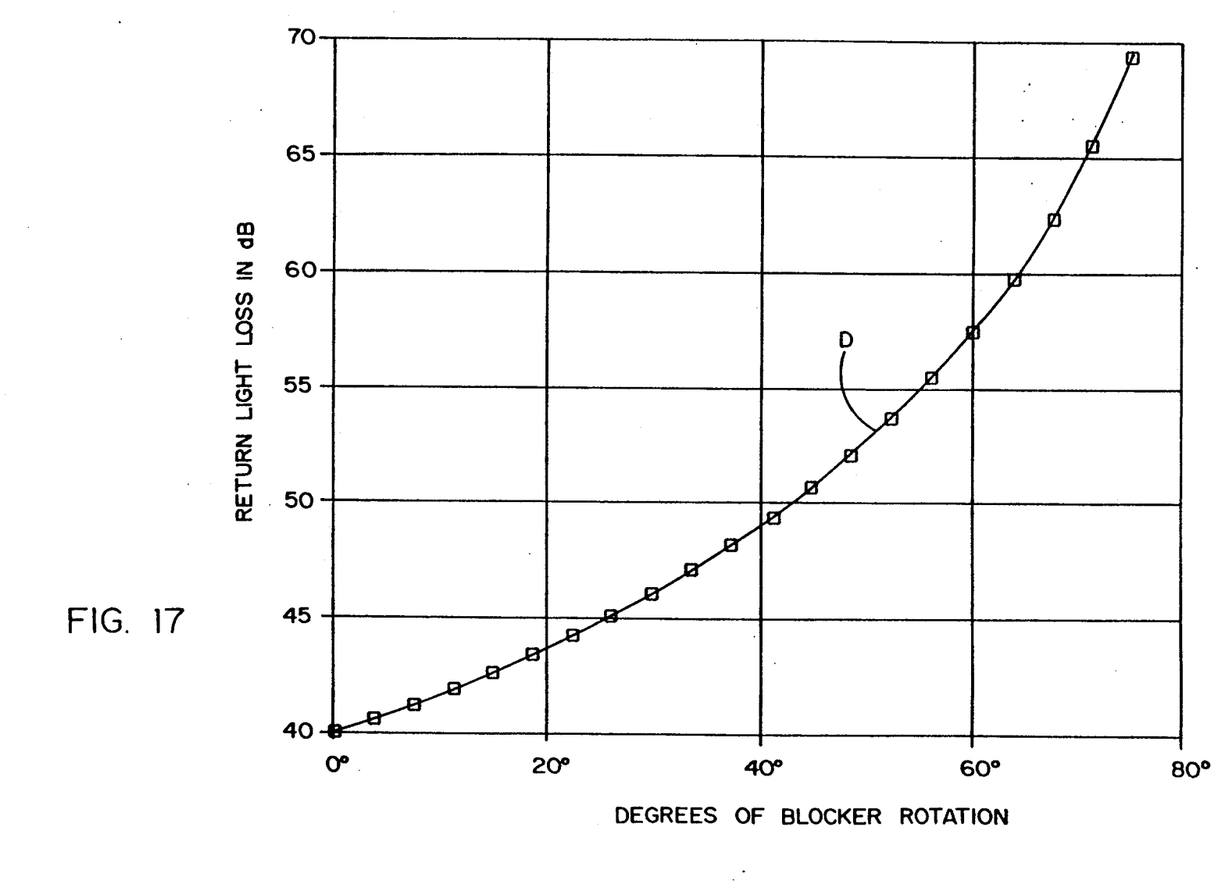
FIG. 17 is a graph which illustrates the effect of diffraction on the optical return loss.

FIG. 17 graphically shows the result of this diffraction effect. The X-axis represents degrees of blocker rotation from its beam-entering position. The Y-axis represents in dBs the loss of return light. A curve D is plotted to represent the relationship between blocker rotation and return light loss. Curve D starts at 40 dB because the collimator specifications call for that value. The return loss due to the diffraction effect follows curve D to a very high value.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A variable optical attenuator comprising:
   an optical signal input means;
   an optical signal output means;
   a first lens which converts the optical signal from the input means into a collimated beam;
   a second lens which receives the collimated beam and causes it to focus into the output means; and
   a mechanical blocker which is gradually moved into the collimated beam in such a way that its outer edge travels along a substantially arcuate path as the blocker gradually attenuates the beam;
   said mechanical blocker (a) having a substantially non-variable opaqueness to the beam, and (b) causing variable attenuation of the beam solely by the extent to which it reduces the area of the beam.

2. The variable optical attenuator of claim 1 which also comprises:
   means for causing pivotal movement of the blocker, resulting in incremental beam-cutting movements of the blocker outer edge whose ratio to corresponding incremental pivotal movements gradually becomes less as attenuation progresses.

3. The variable optical attenuator of claim 2 which also comprises:
   an encoder which provides an output signal proportional to the amount of pivotal movement of the blocker; and
   means for converting the output signal from the encoder into optical attenuation measured in decibels.

4. The variable optical attenuator of claim 3 which also comprises:
   means for visually displaying changes in the optical attenuation.

5. A variable optical attenuator comprising:
   an optical signal input means;
   an optical signal output means;
   a first lens which converts the optical signal from the input means into a collimated beam;
   a second lens which receives the collimated beam and causes it to focus into the output means; and
   a mechanical blocker which is gradually moved into the collimated beam to cause the outer edge of the blocker to move across the beam gradually cutting the beam, said blocker causing beam attenuation by reducing the cross-sectional area of the beam; and
   means for causing motion of the blocker;
   the amount of each increment of motion of the outer edge of the blocker across the beam diameter becoming gradually less for each increment of motion of the blocker.

6. The variable optical attenuator of claim 5 which also comprises:
   an encoder which provides an output signal proportional to the amount of pivotal movement of the blocker; and
   means for converting the output signal from the encoder into optical attenuation measured in decibels.

7. For use in an optical system having a transmitter of optical signals, a receiver of optical signals, and fiber optic cable connecting the transmitter and receiver, a variable optical attenuator adapted to be inserted in the system, comprising:
   an input connector adapted to receive the signals from the transmitter;
   an output connector adapted to send the signals toward the receiver;

a collimator between the input and output connectors which converts the signals into a short length collimated beam; and optical blocker which is substantially impervious to light and which is moved to gradually reduce the size and thus the energy of the collimated beam by moving an edge across the beam in such a way that the vector of each increment of edge motion which is perpendicular to the beam is gradually reduced during successive beam-reducing increments of movement of the blocker.

8. The variable optical attenuator of claim 7 in which the reduction of beam energy is measured in decibels.

9. The variable optical attenuator of claim 8 in which the resolution in decibels of the attenuation during an increment of blocker movement is substantially 0.1 decibel or less throughout the movement of blocker.

10. The variable optical attenuator of claim 7 in which the blocker is a vane-like surface which is pivoted outside the collimated beam, and whose beam-cutting edge moves along an arcuate path.

11. The variable optical attenuator of claim 7 which also comprises:

an encoder which emits an output signal proportional to the amount of movement of the blocker; and means for comparing the output signal to stored values which indicate the beam attenuation in decibels.

12. The method of variably attenuating light transmitted in a fiber optic system which comprises:

inserting into the system a collimator which produces a collimated radiation beam;

causing gradual attenuation of the radiation in the collimated beam by moving a blocker to gradually reduce the beam area;

measuring the blocker movement;

gradually reducing the increment of beam blocking caused by an increment of blocker movement; and converting the measurements of blocker movement into decibels of attenuation of the radiation.

13. For use in an optical system having a transmitter of optical signals, a receiver of optical signals, and fiber optic cable connecting the transmitter and receiver, a variable optical attenuator adapted to be inserted in the system, comprising:

an input connector adapted to receive the signals from the transmitter;

an output connector adapted to send the signals toward the receiver;

a collimator between the input and output connectors which converts the signals into a short length collimated beam;

a beam-attenuating element which (a) has a substantially constant opaqueness to the beam throughout its beam-attenuating area, and (b) is gradually moved to reduce the area of the beam; and a control element for causing movement of the beam-attenuating element in such a way that the amount of beam area attenuated per increment of control element movement decreases as attenuation increases.

14. The system of claim 13 in which:

the beam-attenuating element (a) has a flat surface whose outer edge moves to reduce the beam area, and (b) moves pivotally around an axis which is substantially perpendicular to the axis of symmetry of the beam.

15. The system of claim 14 in which the pivotal axis of the beam-attenuating element is so located that beam attenuation is completed as the flat surface of the beam-attenuating element reaches a position substantially at right angles to the axis of symmetry of the beam.

16. The system of claim 13 in which:

the beam-attenuating element is a rotatable shaft having a slot formed therein in line with the attenuated radiation beam, the entering beam first reaching the convexly-curved outer surface of the shaft, and then being attenuated by the edge of the slot as the shaft is rotated.

* * * * *